(12) United States Patent
Rastegar et al.

(10) Patent No.: US 6,892,644 B2
(45) Date of Patent: May 17, 2005

(54) PROJECTILE HAVING A CASING AND/OR INTERIOR ACTING AS A COMMUNICATION BUS BETWEEN ELECTRONIC COMPONENTS

(75) Inventors: Jahangir S. Rastegar, Stony Brook, NY (US); Harbans Dhadwal, Setauket, NY (US); Thomas Spinelli, East Northport, NY (US)

(73) Assignee: Omnitek Partners LLC, Bayshore, NY (US)

( * ) Notice: Subject to any disclaimer, the term of this patent is extended or adjusted under 35 U.S.C. 154(b) by 0 days.

(21) Appl. No.: 10/638,996

(22) Filed: Aug. 12, 2003

(65) Prior Publication Data

US 2005/0039625 A1 Feb. 24, 2005

(51) Int. Cl.[7] .............................................. F42C 13/02
(52) U.S. Cl. ............................................ 102/213; 89/6
(58) Field of Search ............................. 102/213; 89/6, 89/6.5

(56) References Cited

U.S. PATENT DOCUMENTS

| | | | | |
|---|---|---|---|---|
| 4,091,734 A | * | 5/1978 | Redmond et al. | 102/207 |
| 4,930,419 A | * | 6/1990 | Serby | 89/207 |
| 4,955,279 A | * | 9/1990 | Nahrwold | 89/6.5 |
| 5,078,051 A | * | 1/1992 | Amundson | 102/206 |
| 5,247,866 A | * | 9/1993 | O'Malley | 89/6 |
| 5,983,771 A | * | 11/1999 | Lehr | 89/6.5 |
| 6,170,377 B1 | * | 1/2001 | Larsson et al. | 89/6.5 |
| 6,216,595 B1 | * | 4/2001 | Lamorlette et al. | 102/270 |
| 6,268,785 B1 | * | 7/2001 | Kollman et al. | 336/83 |
| 6,422,507 B1 | * | 7/2002 | Lipeles | 244/3.13 |
| 6,662,703 B2 | * | 12/2003 | Sullivan | 89/6.5 |

* cited by examiner

*Primary Examiner*—Teri Pham Luu
*Assistant Examiner*—Bret Hayes

(57) ABSTRACT

A projectile including: at least two electronic or electrical components; and a casing, the casing having at least a portion thereof acting as a communication bus for connecting the at least two electronic/electrical components. The projectile casing can further have a window for inputting a signal or charging an internal power storage device.

33 Claims, 2 Drawing Sheets

PROJECTILE HAVING A CASING AND/OR INTERIOR ACTING AS A COMMUNICATION BUS BETWEEN ELECTRONIC COMPONENTS

BACKGROUND OF THE INVENTION

1. Field of the Invention

The present invention relates generally to projectiles, and more particularly, to projectiles having a casing and/or interior that act as a communication bus between at least two components of the projectile. For purposes of this disclosure, a projectile is any flying object, such as munitions, rockets, or aircraft. Also for purposes of this disclosure, a communication bus is anything that transmits one or more signals between two or more components. Such transmission may be one-way or two-way. Thus, the transmission may be a simple point-to-point link between two components or a point to many links between several components. Furthermore, the transmission may be such that the transmitted signal(s) are available to any components on the communication bus. Still further, the communication bus may be more than one media, such as a waveguide, potting material, and/or free space in the casing (including the casing itself).

2. Prior Art

Projectiles typically have a casing or shell in which electronic or electrical components are housed. The electronic or electrical (collectively referred to hereinafter as "electronic" or "electronics") components communicate with each other and/or other devices via internal wiring (which includes printed circuit boards). While the wiring has its advantages, it suffers from certain disadvantages such as susceptibility to noise, brittleness, potential for high bit error, takes up a large amount of space in the interior of the casing or shell, can be fragile particularly when subjected to high-g loads, and can suffer from poor connections. In addition, the process of projectile assembly with wiring is cumbersome and time consuming, thereby costly, particularly since in general, numerous components have to be assembled into relatively small spaces. These disadvantages are amplified in certain devices that house electronic components and operate in harsh environments and under high accelerations.

SUMMARY OF THE INVENTION

It is an object of the present invention to provide a projectile that overcomes the disadvantages of the wiring used to link components in projectiles having electronic components.

Accordingly, a projectile is provided. The projectile comprising: at least two electronic or electrical components; and a casing, the casing having at least a portion thereof acting as a communication bus for connecting the at least two electronic or electrical components housed therein.

At least a portion of the casing can be an optical waveguide where one of the at least two electronic or electrical components comprises a transmitter operatively connected to the optical waveguide for transmitting optical signals into the optical waveguide, the other of the at least two electronic or electrical components comprises a detector for detecting the optical signals from the waveguide. At least a portion of the casing can be an ultrasonic waveguide where one of the at least two electronic or electrical components comprises an ultrasonic generator operatively connected to the ultrasonic waveguide for transmitting ultrasound signals into the ultrasonic waveguide, the other of the at least two electronic or electrical components comprises a detector for detecting the ultrasonic signals from the waveguide.

The portion of the casing acting as a communication bus can comprise a waveguide for transmitting signals between the at least two electronic or electrical components. The waveguide can comprise a substantial portion of the nose of the casing. At least one of the at least two electronic or electrical components can comprise a transmitter operatively connected to the waveguide for transmitting at least one signal through the waveguide. At least one of the at least two electronic or electrical components can comprise a detector operatively connected to the waveguide for detecting the at least one signal.

The casing can include a window through which an input signal is transmitted from an exterior of the casing to at least one of the communication bus and one of the at least two electronic or electrical components.

Also provided is a projectile comprising: a casing for housing at least two internal electronic or electrical components; and means for communicating a signal between the at least two internal electronic or electrical components through at least a portion of the casing.

Still provided is a projectile comprising: a casing for holding two or more electronic or electrical components; and a communication bus formed at least in part by the casing; wherein the two or more electronic or electrical components are operatively connected to the communication bus and capable of transmitting and detecting a signal on the communication bus.

Still yet provided is a method for communicating a signal between two or more electronic or electrical components in a projectile having a casing. The method comprising: providing the casing with at least a portion acting as a communication bus; and operatively connecting the two or more electronic or electrical components to the communication bus.

The method can further comprise transmitting a signal on the communication bus for detection by at least one of the two or more electronic or electrical components. The transmitting can comprise transmitting an optical signal on the communication bus. The transmitting can comprise transmitting an ultrasound signal on the communication bus. The providing can comprise fabricating at least a portion of the casing from a material that acts as the communication bus.

The method can further comprise transmitting an input signal through a window in the casing from an exterior of the casing to at least one of the communication bus and one of the two or more electronic or electrical components.

Still yet provided is a projectile comprising: a casing, the casing having at least a portion thereof acting as a communication bus; and a transmitter operatively connected to the communication bus for transmitting a signal on the communication bus.

The projectile can further comprise a detector operatively connected to the communication bus for detecting the signal on the communication bus.

Still yet provided is a projectile comprising: a casing, the casing having at least a portion thereof acting as a communication bus; and a detector operatively connected to the communication bus for detecting a signal on the communication bus. The projectile can further comprise a transmitter operatively connected to the communication bus for transmitting the signal on the communication bus.

Still yet provided is a projectile comprising: a casing; a communication bus disposed in the casing; and a window formed on at least a portion of the casing through which an input signal is transmitted from an exterior of the casing to the communication bus.

Still yet provided is a method for inputting a signal to an interior of a projectile, the method comprising: inputting a signal through at least a portion of a casing of the projectile; and transmitting at least a portion of the signal to one of a communication bus or internal component. The signal can be useful for inputting data to the internal component. The signal can also be useful for charging the internal component where the internal component is a power storage device.

Still yet provided is a projectile comprising: a casing, at least a portion of which contains a potting material; first and second electronic or electrical components, at least one of which is at least partially disposed in the potting material; a transmitter disposed on the first electronic or electrical component for transmitting a signal from the first electronic or electrical component and at least partially through the potting material; and a receiver disposed on the second electronic or electrical component for receiving the signal and transmitting the signal or representative of the signal to the second electronic or electrical component.

The potting material can be selected from a group consisting of a solid, a gel, and a liquid. Where the potting material is the solid, the solid can be an epoxy resin. The signal can be an infrared signal.

The casing can include a window through which an input signal is transmitted from an exterior of the casing to at least one of the potting material, first electronic or electrical component, and second electronic or electrical component.

Still yet provided is a method for communicating a signal between first and second electronic or electrical components contained in a casing of a projectile. The method comprising: encasing at least a portion of one of the first and second electronic or electrical components in a potting material in the casing; and transmitting the signal at least partially through the potting material from the first electronic or electrical component to the second electronic/electrical electronic or electrical component. The method can further comprise inputting a signal through at least a portion of the casing to at least one of the potting material, first electronic or electrical component, and second electronic or electrical component.

Still further provided is a projectile comprising: a casing, at least a portion of which contains a potting material; first and second electronic or electrical components; a transmitter disposed on the first electronic or electrical component for transmitting a signal; and a receiver disposed on the second electronic or electrical component for receiving the signal; wherein the signal is at least partially transmitted through the potting material. The signal can further be transmitted through a free space in the casing.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although the invention is particularly suited to infra-red or optical signal communication between electronic components, such is discussed by way of example only. Those skilled in the art will appreciate that other communication means can also be utilized, such as ultrasound.

Figure 1:
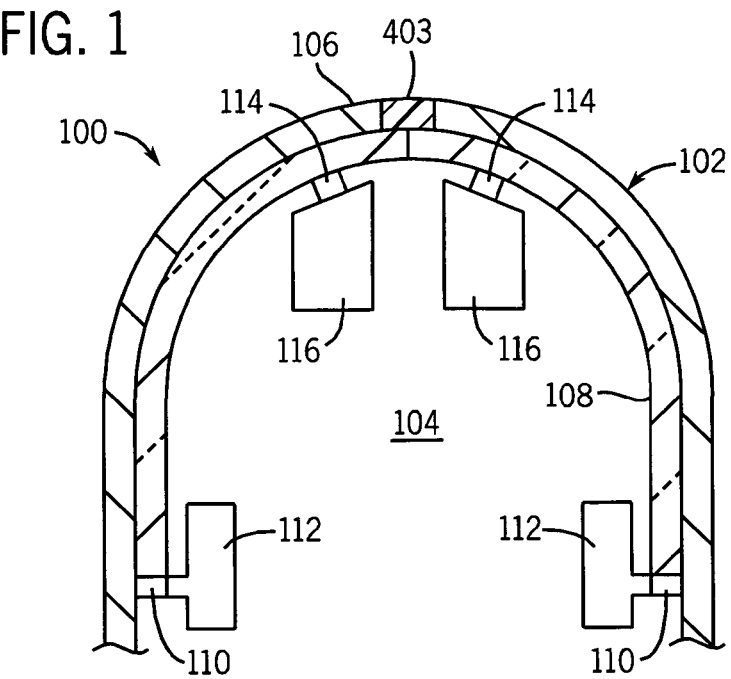
FIG. 1 illustrates a partial sectional view of a nose portion of a projectile according to an embodiment of the present invention.

Referring now to FIG. 1, there is shown a partial sectional view of a nose section of a projectile 100. The projectile has a shell 102 that defines an interior 104. The shell preferably has a metal or composite outer portion 106 and an inner waveguide portion 108. The inner waveguide portion 108 is preferably optical glass having appropriate cladding as is known in the art, however, other at least partially transparent materials such as plastics capable of transmitting a signal can also be utilized, such as clear epoxies. The waveguide portion 108 can be disposed on the entire inner surface of the outer portion 106 or only a portion thereof, such as a strip. Alternatively, the waveguide portion 108 can make up the entire shell 102 (no outer portion 106 is used). Still further the waveguide portion 108 can be disposed in strips which can be formed on an inner surface of the casing 102 or in channels (not shown) formed on the inner surface of the casing 102, such as that disclosed in co-pending U.S. application Ser. No. 10/639,001, filed on the same day herewith and entitled Device Having A Casing and/or an Interior Acting As A Communication Bus Between Electronic Components, the entire contents of which is incorporated herein by its reference. For purposes of this disclosure, "casing" includes not only the shell of the projectile but the internal space therein.

At least one transmitter 110 is arranged on the waveguide portion 108 or proximate thereto such that an optical signal can be transmitted to the waveguide portion 108. The transmitter 110 can be integral with a corresponding electronic component 112 or connected thereto. At another location on the waveguide portion 108 are located detectors 114 for detecting the optical signals in the waveguide portion 108. Each detector 114 is either integral with or connected to another electronic or electrical component 116. Thus, those skilled in the art will appreciate that any component can communicate with another component through the waveguide portion 108, which acts as a communication bus. Of course, each of the components can have both a transmitter 110 and detector 114 such that a two-way communication can be achieved. Although not shown, mutiplexers and demultiplexers can be used such that certain components can operate at selected frequencies and/or wavelengths and not interfere with other components on the bus. The components, such as the transmitter 110 and detector 114 can be fastened to the waveguide portion 108 in a number of ways, such as those also disclosed in co-pending U.S. application Ser. No. 10/639,001 entitled Device Having A Casing Acting As A Communication Bus Between Electronic Components, the entire contents of which has incorporated herein by its reference.

Those skilled in the art will also appreciate that the interior is not cluttered with components and internal wiring resulting in more components being able to occupy a given interior size or the projectile 100 being made smaller than a conventional projectile having the same number of internal components. Other advantages include:

The optical transmission provides robust, interference free channels between physically disconnected components/systems;

The optical transmission is naturally resistant to very high g-loads and harsh environments;

For shorter distances between the transmitter and receiver encountered in projectiles, the system is inexpensive and an extremely low bit rate error (better than $10^{-12}$) can be readily achieved; and Eliminates the need for wires and related problems and space requirements.

Ease of assembly because two parts can be attached or even screwed together easily, which is very difficult with wires running from one part to the other.

Alternatively, ultrasound can be used to communicate between the internal components. In which case, the shell or a portion thereof needs to be able to carry an ultrasound signal between components. Such a shell, or portion thereof, may be constructed from a suitable metal. In the case of ultrasound, an ultrasonic generator is used to place signals on the "bus" (shell) and a corresponding ultrasonic detector detects the ultrasonic signals and relays them to an appropriate component. As discussed above with regard to the optical signal configuration, each component can have both an ultrasonic generator and detector such that two-way communication between components is possible and mutiplexers and demultiplexers can be utilized such that certain components can operate at selected frequencies and/or wavelengths and not interfere with other components on the bus.

Figure 2:
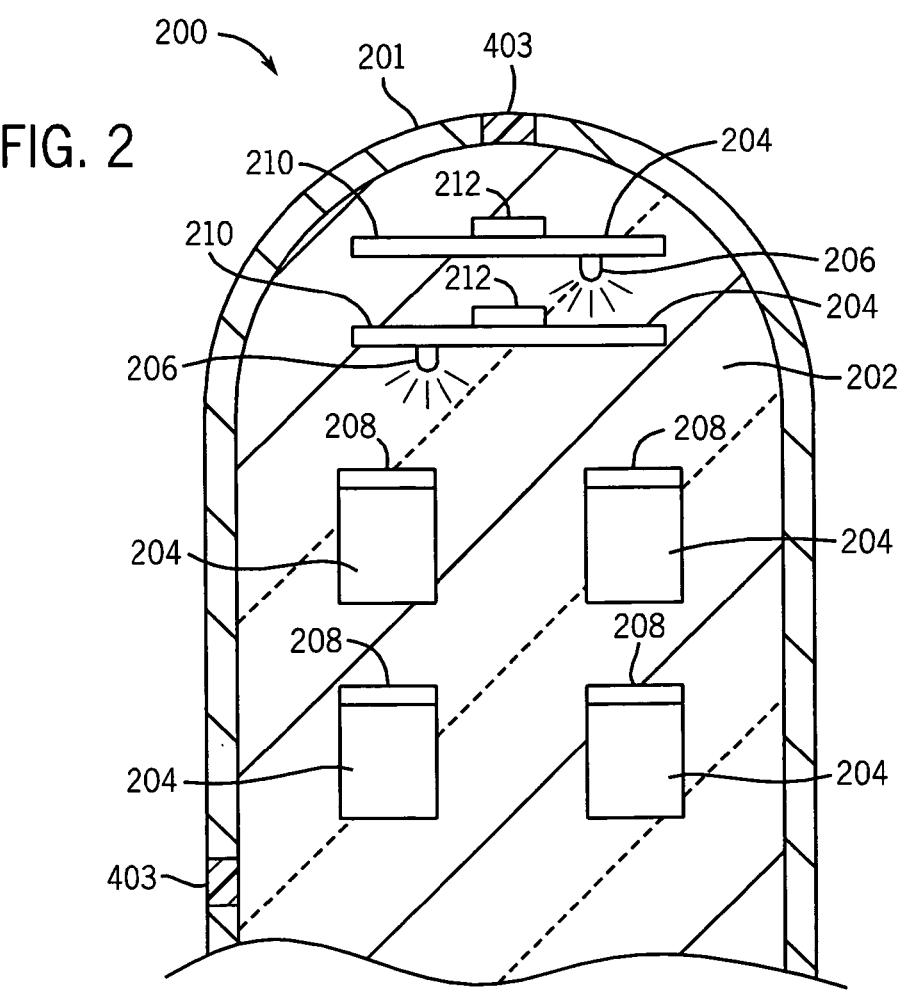
FIG. 2 illustrates a partial sectional view of a nose of a projectile according to another embodiment of the present invention.
Figure 3:
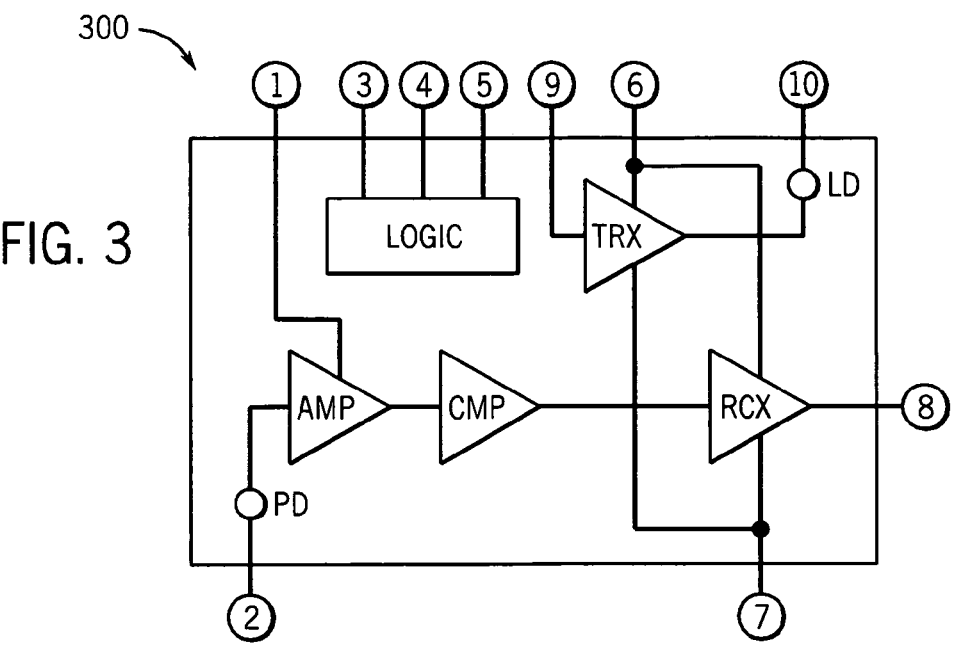
FIG. 3 illustrates a schematic electrical diagram of an infrared (IR) transceiver for use with the projectile of FIG. 2.

Referring now to FIGS. 2 and 3, another embodiment of a projectile is shown, the projectile being referred to generally by reference numeral 200. Typically, electronic or electrical components of projectiles are encased in a potting material, such as an epoxy, to harden the components against noise and shock due to the high acceleration and/or impact experienced by the projectiles. In the embodiment of FIGS. 2 and 3, the potting material 202, which can be a solid, such as an epoxy, a gel, or a liquid is disposed within a casing 201 of the projectile and is used as a communication bus between electronic or electrical components 204. The communication can be wholly within the potting material 202 or may be partially within the potting material 202 and partially in free space. The communication through the potting material is carried out with a transmitter 206, which outputs any wavelength radiation that can propagate through the potting material 202 and be detected by a receiver 208. It is preferred that the potting material 202 be a solid, such as an epoxy to provide hardening of the projectile to shock and noise and it is further preferred that the radiation used as a communication medium is IR energy, preferably from a IR diode. In such an example, the epoxy need not be transparent or substantially transparent as long as it can carry an IR signal over a required distance, such as several hundred mm or less. An example of such an epoxy is DOLPHON® CC-1024-A Low Viscosity Potting and Casting Epoxy Resin with RE-2000 Reactor mixed at a ratio of 10 parts resin to 1 part reactor, each of which is distributed by John C. Dolph Company. The same epoxy resin and reactor can be used for the waveguide portion 108 discussed above with regard to FIG. 1.

IR technology is well known in the art, particularly in the art of remote control of electronic consumer goods. The IR data association (IrDA®) has standards for communicating data via short-range infrared transmission. Transmission rates fall within three broad categories SIR, MIR and FIR, SIR (Serial Infrared) speeds cover transmission speeds normally supported by an RS-232 port. MIR (Medium Infrared) usually refers to speeds of 0.576 Mb/s to 1.152 Mb/s. FIR (Fast Infrared) denotes transmission speeds of about 4 Mb/s. The standard has been modified for faster transmission speeds up to 16 Mb/s (referred to as very fast Infrared VFIR). Although not preferred, visible light, for example from a laser diode, may also be used to transmit communication signals through the potting material 202.

The transmitters 206 may be carried on printed circuit boards 210 which may also be encased in the potting material 202 or disposed freely throughout the potting material 202. The printed circuit boards each 210 preferably carry their own power supply, such as a battery 212 to eliminate internal wiring. Alternatively, the batteries may be charged as discussed below through the casing 201 by directing energy into the casing 201 with a charging cap. Each of the electronic or electrical components 204 has a receiver 208 for communicating with the transmitters 206. As discussed above with regard to the first embodiment, each of the electronic or electrical components 204 preferably have a receiver 208 and a transmitter 206 such that they can carry out a two-way communication. An example of such a transceiver module 300 is shown in the schematic diagram of FIG. 3. FIG. 3 shows an (IrDA®) transceiver manufactured by Sharp Inc. (2P2W1001YP) which is relatively inexpensive and contains a high speed, high efficiency low power consumption light emitting diode (LD), a silicon PIN photodiode (PD) and a low power bipolar integrated circuit. The circuit contains an LED driver (TRX) and a receiver circuit (RCX) that delivers 4 Mb/s operation for distances of 1 meter. The LED emitter transmits at a nominal wavelength of 880 nm with a radiant intensity in the range of 100 to 500 $mW.sr^{-1}$, with a radiation angle of +/− 15 degrees. The pin photodiode has an integrated amplifier (AMP) and comparator (CMP), which provide a fixed voltage output over a broad range of input optical power levels and data rates. The same or similar transceiver module 300 can also be used for the other embodiments described above with regard to FIG. 1.

The casing 102 can also be provided with a window portion 403, as shown in FIGS. 1 and 2, which can be used to upload or input data or instructions into components of the projectile through the waveguide portion 108 or potting material 202. In a preferred implementation, the window portion 403 is in optical communication with the waveguide portion 108 or potting material 202 and transmits any input signals to the appropriate components on the interior of the projectile. Although described in terms of a transparent window 403 and signal, the input signal can be any signal that propagates through the waveguide portion 108 or potting material 202, such as an IR or ultrasound signal. Furthermore, the window 403 does not have to be a transparent window but merely a portion of the shell, which is capable of transmitting a signal from the exterior of the projectile to one or more components on the interior of the projectile. Although the window 403 is shown on the tip of the nose and on a lower side of the casing, those skilled in the art will appreciate that the window 403 may be located anywhere on the casing of the projectile.

The window 403 can also be utilized to partially power a capacitor, rechargeable battery, or electric power storage device in the interior of the projectile, particularly for the purpose of transmitting required data. Thus, a power storage device can be charged, at least partially, thru the window 403 to enable transfer of data. The charging signal transmitted through the window may be modulated to transmit data as well.

Figure 4:
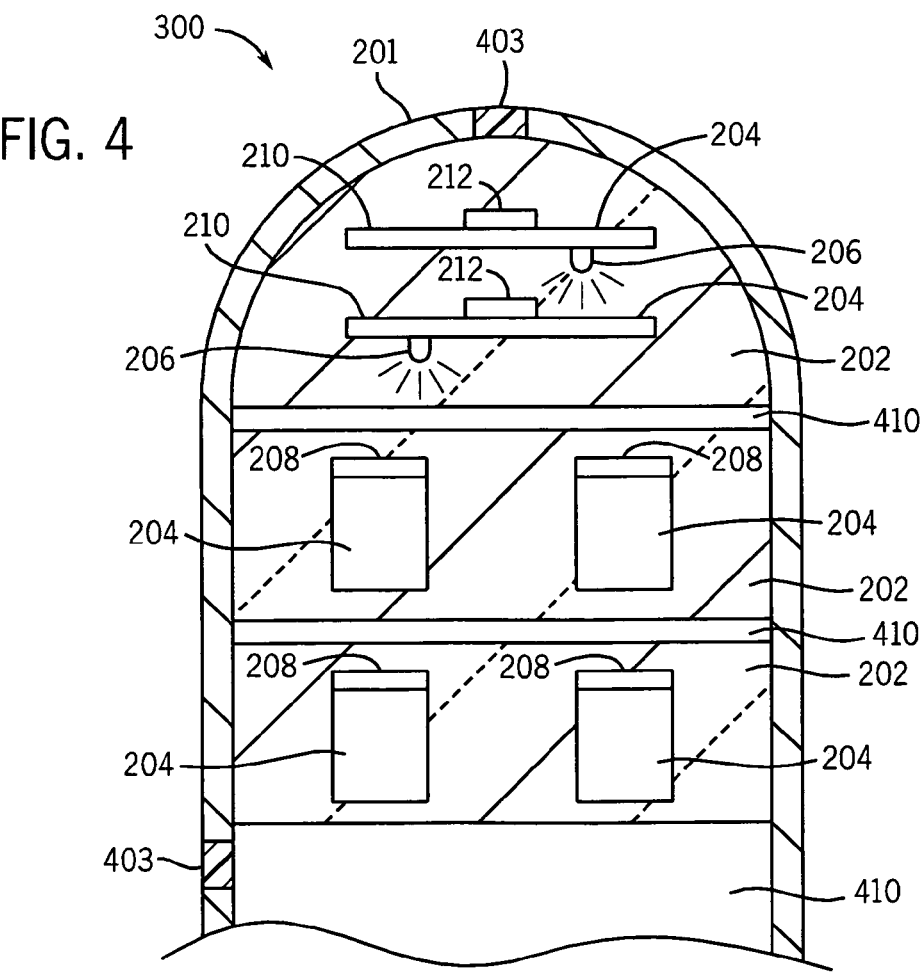
FIG. 4 illustrates a projectile according to another embodiment of the present invention.

Referring now to FIG. 4, there is shown a projectile according to another embodiment of the present invention, in which similar reference numerals from FIG. 2 denote similar features, the projectile of FIG. 4 being referred to generally by reference numeral 300. FIG. 4 is similar to that of FIG. 2 with the exception that the potting material does not have to completely encase a portion of the projectile's interior. The interior of the projectile includes portions of free space 410 (which may be filled with air or other gases or may be evacuated. Although all of the components 204, 208 are shown encased in the potting material 202, they can also be provided in the free space 410 or partially in the free space 410. Thus, the communication between components is not only through the potting material 202 but can also be done through the free space 410 inside the projectile. The embodiment of FIG. 4 is particularly suitable for wireless sensor communication where the use of wire harnesses is highly cumbersome and expensive and subject to harsh environments. One can, for example send a signal from a sensor mounted on one part of a component to another without wires and without generating RF noise.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A projectile comprising:
   at least two electronic or electrical components; and
   a casing, the casing having at least a portion thereof being a communication bus for connecting the at least two electronic or electrical components housed therein.

2. The projectile of claim 1, wherein at least a portion of the casing is an optical waveguide where one of the at least two electronic or electrical components comprises a transmitter operatively connected to the optical waveguide for transmitting optical signals into the optical waveguide, the other of the at least two electronic or electrical components comprises a detector for detecting the optical signals from the waveguide.

3. The projectile of claim 1, wherein at least a portion of the casing is an ultrasonic waveguide where one of the at least two electronic or electrical components comprises an ultrasonic generator operatively connected to the ultrasonic waveguide for transmitting ultrasound signals into the ultrasonic waveguide, the other of the at least two electronic or electrical components comprises a detector for detecting the ultrasonic signals from the waveguide.

4. The projectile of claim 1, wherein the portion of the casing acting as the communication bus comprises a waveguide for transmitting signals between the at least two electronic/electrical electronic or electrical components.

5. The projectile of claim 4, wherein the waveguide comprises a substantial portion of a nose of the casing.

6. The projectile of claim 1, wherein at least one of the at least two electronic or electrical components comprises a transmitter operatively connected to the communication bus for transmitting at least one signal through the communication bus waveguide.

7. The projectile of claim 6, wherein at least one of the at least two electronic or electrical components comprises a detector operatively connected to the communication bus for detecting the at least one signal.

8. The projectile of claim 1, wherein the casing includes a window through which an input signal is transmitted from an exterior of the casing to at least one of the communication bus and one of the at least two electronic or electrical components.

9. A projectile comprising:
   a casing for housing at least two internal electronic or electrical components; and
   means for communicating a signal between the at least two internal electronic or electrical components through at least a portion of the casing.

10. A projectile comprising:
    a casing for holding two or more electronic or electrical components; and
    a communication bus formed at least in part by the casing;
    wherein the two or more electronic or electrical components are operatively connected to the communication bus and capable of transmitting and detecting a signal on the communication bus.

11. A method for communicating a signal between two or more electronic or electrical components in a projectile having a casing, the method comprising:
    providing the casing with at least a portion being a communication bus; and
    operatively connecting the two or more electronic or electrical components to the communication bus.

12. The method of claim 11, further comprising transmitting a signal on the communication bus for detection by at least one of the two or more electronic or electrical components.

13. The method of claim 12, wherein the transmitting comprises transmitting an optical signal on the communication bus.

14. The method of claim 12, wherein the transmitting comprises transmitting an ultrasound signal on the communication bus.

15. The method of claim 11, wherein the providing comprises fabricating at least a portion of the casing from a material that acts as the communication bus.

16. The method of claim 11, further comprising transmitting an input signal through a window in the casing from an exterior of the casing to at least one of the communication bus and one of the two or more electronic or electrical components.

17. A projectile comprising:
    a casing, the casing having at least a portion thereof being a communication bus; and
    a transmitter operatively connected to the communication bus for transmitting a signal on the communication bus.

18. The projectile of claim 17, further comprising a detector operatively connected to the communication bus for detecting the signal on the communication bus.

19. A projectile comprising:
    a casing, the casing having at least a portion thereof being a communication bus; and
    a detector operatively connected to the communication bus for detecting a signal on the communication bus.

20. The projectile of claim 19, further comprising a transmitter operatively connected to the communication bus for transmitting the signal on the communication bus.

21. A projectile comprising:
a casing;
a communication bus disposed in the casing; and
a window formed in at least a portion of the casing through which an input signal is transmitted from an exterior of the casing to the communication bus.

22. A method for inputting a signal to an interior of a projectile, the method comprising:
inputting a signal through at least a portion of a casing of the projectile; and
transmitting at least a portion of the signal to a communication bus.

23. The method of claim 22, wherein the signal is useful for inputting data to an internal component connected to the communication bus.

24. The method of claim 22, wherein the signal is useful for charging an internal component connected to the communication bus where the internal component is a power storage device.

25. A projectile comprising:
a casing, at least a portion of which contains a potting material;
first and second electronic or electrical components, at least one of which is at least partially disposed in the potting material;
a transmitter disposed on the first electronic or electrical component for transmitting a signal from the first electronic or electrical component and at least partially through the potting material; and
a receiver disposed on the second electronic or electrical component for receiving the signal and transmitting the signal or a representative of the signal to the second electronic or electrical component.

26. The projectile of claim 25, wherein the potting material is selected from a group consisting of a solid, a gel, and a liquid.

27. The projectile of claim 26, wherein the potting material is the solid and the solid is an epoxy resin.

28. The projectile of claim 25, wherein the signal is an infrared signal.

29. The projectile of claim 25, wherein the casing includes a window through which an input signal is transmitted from an exterior of the casing to at least one of the potting material, first electronic or electrical component, and second electronic or electrical component.

30. A method for communicating a signal between first and second electronic or electrical components contained in a casing of a projectile, the method comprising:
encasing at least a portion of one of the first and second electronic or electrical components in a potting material in the casing; and
transmitting the signal at least partially through the potting material from the first electronic or electrical component to the second electronic or electrical component.

31. The method of claim 30, further comprising inputting an input signal through at least a portion of the casing to at least one of the potting material, first electronic or electrical component, and second electronic or electrical component.

32. A projectile comprising:
a casing, at least a portion of which contains a potting material;
first and second electronic or electrical components;
a transmitter disposed on the first electronic/electrical electronic or electrical component for transmitting a signal; and
a receiver disposed on the second electronic or electrical component for receiving the signal;
wherein the signal is at least partially transmitted through the potting material.

33. The projectile of claim 32, wherein the signal is further transmitted through a free space in the casing.

* * * * *